Dec. 2, 1969          K. WILDE          3,482,075
LASER BEAM APPARATUS FOR DYNAMIC BALANCING OF A WORKPIECE
Filed Oct. 17, 1966
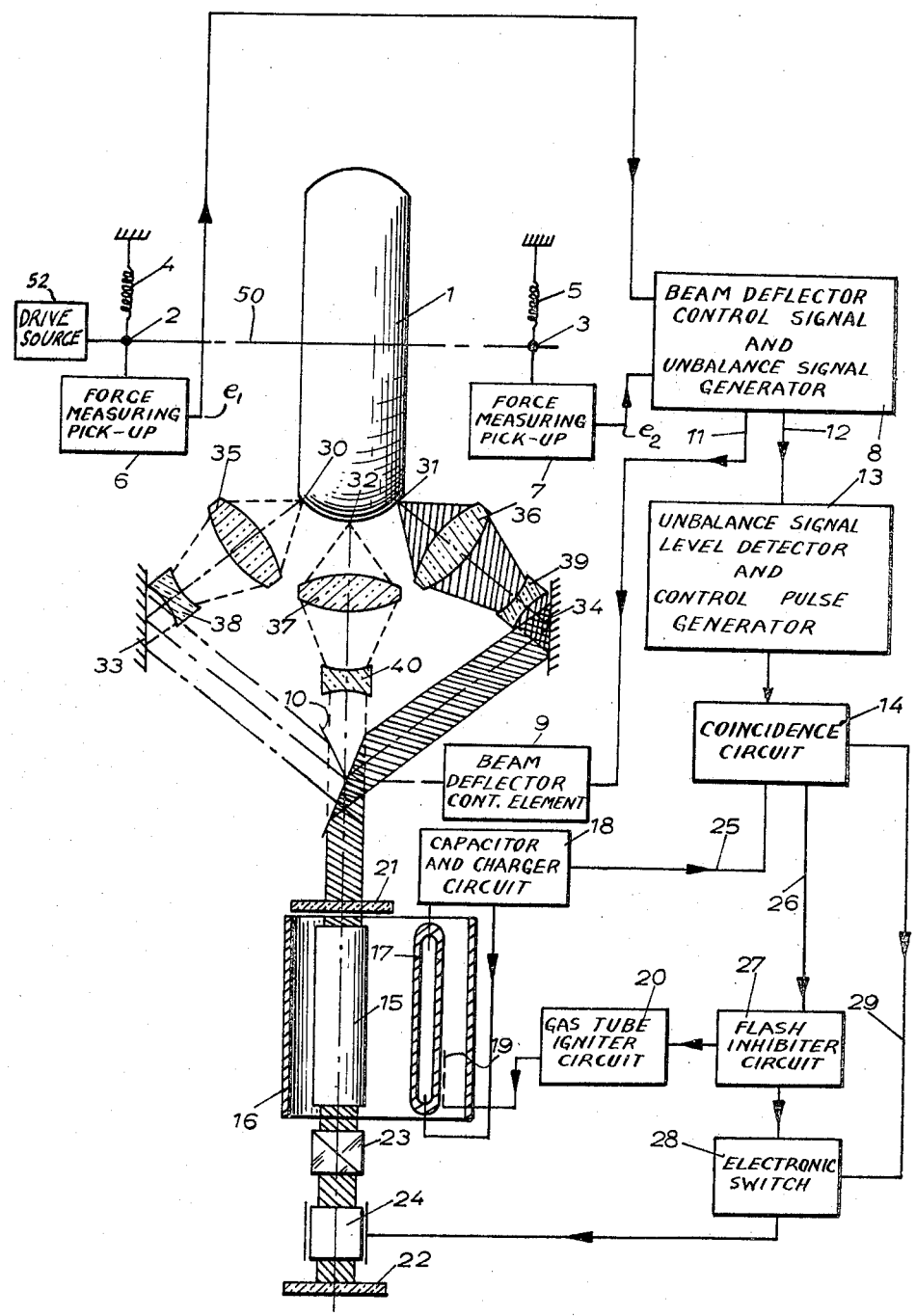
INVENTOR.
Kurt Wilde United States Patent Office 3,482,075
Patented Dec. 2, 1969

3,482,075
LASER BEAM APPARATUS FOR DYNAMIC BALANCING OF A WORKPIECE
Kurt Wilde, Rehmenhalde, Germany, assignor of one-half to Fluggeratewerk Bodensee GmbH, Uberlingen, Bodensee, Germany
Filed Oct. 17, 1966, Ser. No. 587,025
Claims priority, application Germany, Oct. 26, 1965, F 47,513
Int. Cl. B23k *9/00, 9/16*
U.S. Cl. 219—121                         3 Claims

ABSTRACT OF THE DISCLOSURE

The balancing apparatus includes means for rotating a body and for providing an indication of the magnitude and direction of unbalance in the body. A laser device is adapted for projection into the rotating body for removal of body material to achieve balance. Means are provided for altering the position of impingement of the laser beam on the body and for interrupting the impingement thereof in order to provide removal of a quantity of the body material at a position on the body for achieving the desired balance.

---

This invention relates to a method and an apparatus for providing precision balancing of bodies. The invention relates more particularly to an improved method and apparatus for providing precision balancing.

The need often arises for the precision, dynamic balancing of various bodies used in different forms of equipment. For example, the rotation element of a gyroscope should desirably have a high degree of dynamic balance. Various arrangements have been provided for approaching the desired balance but have suffered from one or more disadvantages rendering the balancing arrangement complex or costly. Known arrangements generally provide rotation of the body and means for generating signals indicative of the unbalance as the body rotates. Material removing means function responsive to these signals to remove portions of the body until the signals drop below a specified level, indicating that the desired dynamic balancing of the bodies has been attained.

In one prior arrangement, electrical means comprising sparks or arcs are controlled by the unbalance signals and burn off the excessive material from the body as the body is rotated past an operating station. However, an arrangement of this form removes relatively large amounts of material and, therefore, limits the accuracy of balancing. This is of significance particularly to bodies operating at extremely high speeds, such as the rotors of a gyroscope. Furthermore, this arrangement requires that the body itself be formed of an electrically conductive material, a limitation which is not always desirable. In addition, the use of high voltages for removing portions of the unbalanced body at times could constitute a safety hazard.

In another arrangement, the apparatus includes an electron beam for the removal of the excess of material from the body. However, these balancing machines require a considerable amount of equipment and are accordingly complex and expensive since the balancing must be effected in a high vacuum.

Accordingly, it is an object of the present invention to provide an improved method of balancing for effecting accurate and highly sensitive balance of a body.

Another object of the invention is to provide a relatively uncomplex method for accomplishing the accurate and highly sensitive balancing.

A further object of the invention is to provide an apparatus of the type referred-to for effecting a relatively accurate and highly sensitive balancing while requiring a relatively uncomplex and inexpensive arrangement.

A balancing apparatus in accordance with the present invention includes means for rotating a body about an axis and for providing an indication of the magnitude and direction of unbalance in the body. A body material removal means comprising a coherent light beam is adapted for projection onto the rotating body with an intensity for removal of body material. Means responsive to the body unbalance indication synchronize the projection of the beam with the rotation of the body in a manner for reducing the unbalance to an acceptable value.

In accordance with another feature of the invention, means are provided for causing a coherent light beam to be pulsatingly projected at the rotating body in a manner for automatically removing the material at different and circumferential positions of the body until an acceptable predetermined balance condition has been attained.

Through this arrangement, relatively small amounts of the body material, on the order of milligrams, will be burned off or evaporated and a very sensitive removal for achieving desired balance is attainable. Furthermore, the operation may be carried out in an atmospheric environment thus avoiding a requirement for high vacuum equipment. In addition, the body may be formed of any suitable material including metal, and exposed high voltage elements of a prior arrangement are avoided.

These and other objects and features of the invention will become apparent with reference to the following specifications and the drawing which is a schematic representation of the balancing apparatus constructed in accordance with features of the present invention.

Referring now to the drawing, an initially unbalanced body 1, formed of metal or other suitable material, is mounted in bearings 2 and 3 and is caused to rotate about the axis 50 by a suitable flexibly coupled driving means 52. The body is rotated past a forming station indicated generally by the numerals 30, 31, and 32. In a particular arrangement, the body 1 may comprise the rotor of a gyroscope. The bearings 2 and 3 are forced against force-measuring pick-ups 6 and 7 respectively by springs 4 and 5 respectively. Alternatively, the bearings 2 and 3 may oscillate freely in which case the pick-ups then measure the paths of the oscillations. Rotation of the unbalanced body causes these forces to vary in accordance with the magnitude and direction of unbalance. Pick-up voltages $e_1$ and $e_2$ are generated by the force-measuring pick-ups 6 and 7 respectively and are applied to circuit means represented by block 8 for generating a light beam deflector control signal and an unbalance signal. The block 8 includes a circuit arrangement adapted to produce electrical signals corresponding to the static and dynamic unbalance of the unbalanced body 1; to supply a control signal to a control element 9 for a light beam deflecting means comprising a mirror 10; and to provide periodic unbalance signals according to the static or dynamic unbalance of the body 1 in correspondence with the position of the mirror 10. The latter signal is provided at output line 12 while the beam deflector control signal is provided at output line 11. The signal to the beam deflector control element 9 operates to control the laser beam (described hereinafter) in a manner for deflecting the beam to different balancing planes. The output unbalance signal is applied to an unbalance signal level detector and control pulse generator represented generally by the block 13. This circuit arrangement examines the signal on output line 12 to determine whether the signals exceed a predetermined threshold value which approximately corresponds to the amount of material to be removed by a laser flash, and in such cases produces control pulses for the laser. These control pulses are applied to a coincident circuit 14, the function of which is described hereinafter.

A coherent light source is provided for projection onto the body 1 in a manner for removal of body material. The coherent light source comprises a laser having a ruby bar 15 arranged in one focal plane of an elliptic cylinder 16. An elongated gas discharge flash bulb 17 is located in another focal plane of the cylinder 16. The flash bulb 17 comprises a zenon-thallium lamp having electrodes thereof connected to the storage or voltage capacitor, not illustrated, but included in a capacitor and charger circuit which is represented generally by the block 18. The gas tube 17 is ignited by an ignition electrode 19 when a voltage peak is applied to this electrode by the ignition unit 20.

The ruby bar 15 has two surface-ground front faces and is arranged with these between two plane mirrors 21 and 22 (resonator plates), of which the mirror 21 is partially transmission. Between the ruby bar 15 and the mirror 22 there are provided a polarizer 23 as well as an electrically controlled polarization element, for instance in the form of a Kerr cell or an electro-optic crystal. As long as a voltage is applied across the electrically controlled polarization element, the directions of polarization of polarizer 23 and polarization element 24 are crossed to each other so that this combination is effective to prevent light from passing through. When, however, the voltage is removed from the Kerr cell or the like, then the polarized light of the polarizer is free to pass through the same. Thus, the combination of polarizer 23 and polarization element 24 practically constitutes an electrically controlled, inertia-less shutter. By a flash of the lamp 17 electrons in the ruby bar 15 are raised to a higher energy level. From this energy level they first drop under fluoroescence with a relatively small half life on an intermediate level from which they alone only return to the ground state with a relatively long half life. However, they return to the ground state under emission of light when being excited to do so by light of the wave length to be emitted. If, now, the passage of the light towards mirror 22 is released by the Kerr cell or the like 24, then the always present spontaneously emitted light with the wave length corresponding to the transition is reflected back and forth between the mirrors 21 and 22 and in the manner of a chain reaction releases the transition of the excited electrons into the ground state. A sharply focused, parallel and monochromatic beam of rays is produced.

This beam occurs as flash of light of extremely short duration, the capacity of which is, however, just as extremely high. This flash-like light beam may then, when impinging on the surface of the unbalance body 1 evaporate or spatter a certain small amount of material.

When the storage capacitor of unit 18 is charged, it then supplies a corresponding information to the coincidence stage 14 via line 25. This stage via line 26 first supplies a pulse for igniting the flash of lamp 17, whereby a pickup 27 releases the flash of the lamp via the ignition device 20 and the ruby bar 15 is excited. At the same time, a stand-by signal is supplied to a quick electronic voltage switch 28. For a certain short time of, say 1 millisecond after the release of the flash the switching pulse derived from the unbalance signal for the Kerr cell 24 and the laser flash is supplied to the switch 28 via line 29. Thereby, the voltage is switched off from the Kerr cell 24 and therewith the laser flash is released in the manner as described.

This laser flash always impinges upon a specific spot corresponding to the unbalance on the unbalance body 1. Flashing is continued, and thus, material removed until the respective unbalance is removed and the unbalance signal in the circuit arrangement drops below said threshold value.

The mirror 10 rotatable by the final control element 9 optionally directs the laser beam, as is illustrated, on the spots 30, 31 or 32.

In the latter case it is simply parallel with respect to the beam. In the first two cases the laser beam is deflected on the unbalance body 1 by stationary plane mirrors 33 or 34. The parallel light beam of the laser is focused through objectives 35, 36, 37 on the unbalance body. In order to avoid that the front lens of the multiple lens objectives (which are illustrated here schematically as simple lenses), is not affected by the energy-bearing light beam, the light beam is dispersed in a manner known per se by a dispersing optical element 38, 39 and 40, respectively, prior thereto so that it is distributed over the whole aperture of the focusing objective.

While I have illustrated and described a particular embodiment of my invention, it will be understood that various modifications may be made therein without departing from the spirit of the invention and the scope of the appended claims.

What is claimed is:

1. Apparatus for balancing a body comprising means for rotating the body about an axis and past a forming station, means coupled to said axis for generating electrical signals indicative of the magnitude and axial direction of mass unbalance, a laser light source providing a body-forming light beam, means for altering the position of beam impingement including first and second reflective surfaces orientated with respect to said body and adapted for reflecting a light beam impinging thereon at said work body, a third reflective surface positioned in the path of said laser light beam and adapted for reflecting said laser light beam at said first and second surfaces, and means responsive to said electrical signal and coupled to said third reflective surface for varying the direction of reflectivity of said surface in accordance with the imbalance of said body, and means responsive to said electrical signal for interrupting the projection of said light beam for controlling the quantity of body material being removed.

2. The apparatus of claim 1 wherein said means for interrupting projection of said light beam includes circuit means for detecting the amplitude of said electrical signal and for generating a control signal when said amplitude attains a pre-established level and polarizing means responsive to said control signal for interrupting projection of said beam.

3. The apparatus of claim 2 wherein said laser includes an optical resonant cavity and polarizing means are disposed in the path of said light beam in said cavity.

References Cited

UNITED STATES PATENTS

| 3,096,767 | 7/1963 | Gresser et al. | 219—121 |
| 3,200,697 | 8/1965 | Goubau | 331—94.5 |
| 3,243,724 | 3/1966 | Vuylsteke | 331—94.5 |
| 3,256,524 | 6/1966 | Stauffer | 219—121 |
| 3,259,730 | 7/1966 | Wehde et al. | 219—121 |
| 3,281,712 | 10/1966 | Koester | 219—121 |
| 3,296,594 | 1/1967 | Van Heerden | 219—121 |
| 3,360,733 | 12/1967 | Vali et al. | 219—121 |

OTHER REFERENCES

"Proceedings of the IEEE," vol. 52, No. 8, August 1964, p. 966 (Figure 1).

ANTHONY BARTIS, Primary Examiner

W. D. BROOKS, Assistant Examiner

U.S. Cl. X.R.

219—69